(12) United States Patent
Baker et al.

(10) Patent No.: US 9,957,890 B2
(45) Date of Patent: May 1, 2018

(54) MANIFOLD FOR GAS TURBINE

(71) Applicant: UNITED TECHNOLOGIES CORPORATION, Hartford, CT (US)

(72) Inventors: Stephanie Baker, East Hampton, CT (US); John Otto, Middletown, CT (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 446 days.

(21) Appl. No.: 14/866,204

(22) Filed: Sep. 25, 2015

(65) Prior Publication Data
US 2016/0010550 A1 Jan. 14, 2016

Related U.S. Application Data

(63) Continuation of application No. PCT/US2014/033205, filed on Apr. 7, 2014.

(60) Provisional application No. 61/831,960, filed on Jun. 6, 2013.

(51) Int. Cl.
| | | |
|---|---|---|
| *F01D 25/18* | (2006.01) | |
| *F02C 7/06* | (2006.01) | |
| *F16H 57/04* | (2010.01) | |
| *F01D 15/12* | (2006.01) | |
| *F02C 3/04* | (2006.01) | |
| *F02C 7/36* | (2006.01) | |
| *F02K 3/06* | (2006.01) | |

(52) U.S. Cl.
CPC ............... *F02C 7/06* (2013.01); *F01D 15/12* (2013.01); *F01D 25/18* (2013.01); *F02C 3/04* (2013.01); *F02C 7/36* (2013.01); *F16H 57/04* (2013.01); *F02K 3/06* (2013.01); *F05D 2220/30* (2013.01); *F05D 2240/60* (2013.01); *F05D 2260/40311* (2013.01); *F05D 2260/98* (2013.01)

(58) Field of Classification Search
CPC .. F02C 7/06; F02C 7/222; F01D 15/12; F01D 25/18; F16H 57/04; F05D 2260/98
See application file for complete search history.

(56) References Cited

U.S. PATENT DOCUMENTS

| | | | | |
|---|---|---|---|---|
| 1,588,632 A | * | 6/1926 | Sullivan | .................... F01C 1/00 60/39.08 |
| 3,713,461 A | * | 1/1973 | Notelteirs | ................. H01J 9/38 137/246 |

(Continued)

FOREIGN PATENT DOCUMENTS

| | | |
|---|---|---|
| EP | 2844855 | 3/2011 |
| JP | 2007139128 | 6/2007 |

OTHER PUBLICATIONS

International Search Report and Written Opinion dated Feb. 24, 2015 in PCT Application No. PCT/US2014/033205.

(Continued)

*Primary Examiner* — Lorne Meade
*Assistant Examiner* — Eric Linderman
(74) *Attorney, Agent, or Firm* — Snell & Wilmer L.L.P.

(57) ABSTRACT

In various embodiments, a manifold assembly (64) for conducting one or more fluids to a gear assembly (60) in a gas turbine engine (20) is provided. The manifold assembly (64) may comprise a first plate (66) and a second plate (68) that rotatably couple together. The manifold assembly (64) may be retained and/or held together by a channel (72) and engagement member (70) arrangement.

20 Claims, 5 Drawing Sheets

(56) References Cited

U.S. PATENT DOCUMENTS

| | | | | |
|---|---|---|---|---|
| 4,260,181 A * | 4/1981 | Curtin | F16L 55/17 | 138/100 |
| 4,265,334 A * | 5/1981 | Benhase, Jr. | F01D 25/18 | 184/6.11 |
| 4,550,927 A * | 11/1985 | Resele | B62K 19/00 | 280/281.1 |
| 4,553,855 A * | 11/1985 | De Choudhury | F16C 27/02 | 384/215 |
| 4,916,894 A * | 4/1990 | Adamson | F02C 3/107 | 416/171 |
| 4,969,325 A * | 11/1990 | Adamson | F02C 3/067 | 416/129 |
| 4,979,872 A * | 12/1990 | Myers | F01D 9/065 | 403/131 |
| 5,007,666 A * | 4/1991 | Kyfes | B29C 65/58 | 138/162 |
| 5,018,407 A * | 5/1991 | Hoecht | F16H 57/0421 | 184/109 |
| 5,160,251 A * | 11/1992 | Ciokajlo | F01D 25/162 | 415/142 |
| 5,398,843 A * | 3/1995 | Warden | B65D 43/0212 | 220/254.1 |
| 5,462,312 A * | 10/1995 | Carpenter | F16L 7/00 | 285/15 |
| 5,875,821 A * | 3/1999 | Dumser | F24F 13/20 | 138/157 |
| 6,223,616 B1 * | 5/2001 | Sheridan | F16H 1/2827 | 184/6.12 |
| 6,851,722 B2 * | 2/2005 | Chiu | F16H 25/2214 | 285/134.1 |
| 6,997,618 B2 * | 2/2006 | Delano | F01D 25/16 | 184/5.1 |
| 7,021,042 B2 * | 4/2006 | Law | C23C 14/0623 | 384/913 |
| 7,182,155 B2 * | 2/2007 | Lange | E02D 1/04 | 175/244 |
| 7,329,048 B2 * | 2/2008 | Klusman | F01D 25/125 | 384/99 |
| 7,841,363 B1 | 11/2010 | Suharno | | |
| 8,205,432 B2 * | 6/2012 | Sheridan | F02C 7/36 | 60/226.1 |
| 8,381,878 B2 * | 2/2013 | DiBenedetto | F01D 25/18 | 184/6.11 |
| 2003/0021503 A1 * | 1/2003 | Branagan | F16C 17/06 | 384/303 |
| 2006/0213572 A1 * | 9/2006 | Beaulieu | F16L 59/024 | 138/155 |
| 2006/0223664 A1 * | 10/2006 | Duong | F16H 57/0479 | 475/159 |
| 2008/0096714 A1 * | 4/2008 | McCune | F01D 25/20 | 475/159 |
| 2009/0252604 A1 * | 10/2009 | Alexander | F01D 25/125 | 415/180 |
| 2010/0096395 A1 * | 4/2010 | Miller | B65D 47/06 | 220/711 |
| 2010/0105516 A1 * | 4/2010 | Sheridan | F01D 25/18 | 475/346 |
| 2010/0111681 A1 * | 5/2010 | Nakano | F01D 25/16 | 415/180 |
| 2010/0317477 A1 * | 12/2010 | Sheridan | F02C 7/06 | 475/159 |
| 2010/0331139 A1 * | 12/2010 | McCune | F02C 7/06 | 475/331 |
| 2010/0331140 A1 * | 12/2010 | McCune | F01D 25/162 | 475/331 |
| 2011/0088885 A1 | 4/2011 | Samuelson et al. | | |
| 2011/0022022 A1 | 9/2011 | Ellis | | |
| 2012/0104883 A1 | 5/2012 | Burns et al. | | |
| 2013/0105116 A1 | 5/2013 | Campbell et al. | | |
| 2013/0283756 A1 * | 10/2013 | Baker | F02K 3/06 | 60/39.01 |
| 2014/0013771 A1 * | 1/2014 | Farah | F02C 7/20 | 60/797 |
| 2014/0102110 A1 * | 4/2014 | Farah | F01D 25/28 | 60/772 |
| 2014/0161591 A1 * | 6/2014 | Venter | F01D 25/20 | 415/122.1 |
| 2014/0182972 A1 * | 7/2014 | Hetherington | F02C 7/06 | 184/6.11 |
| 2015/0240660 A1 * | 8/2015 | Sonokawa | F02C 7/18 | 415/111 |
| 2015/0361811 A1 * | 12/2015 | Schwarz | F01D 25/18 | 60/39.08 |
| 2016/0010563 A1 * | 1/2016 | Sheridan | F16H 57/0442 | 60/806 |
| 2016/0032773 A1 * | 2/2016 | James | F01D 25/20 | 416/170 R |
| 2016/0090871 A1 * | 3/2016 | Olsen | F16C 33/6685 | 416/174 |
| 2016/0123233 A1 * | 5/2016 | Cigal | F01D 25/164 | 60/226.1 |
| 2016/0160686 A1 * | 6/2016 | Cigal | F01D 25/20 | 184/6.11 |
| 2016/0177784 A1 * | 6/2016 | Archer | F01D 25/16 | 415/170.1 |
| 2016/0201801 A1 * | 7/2016 | Harral | F16C 3/03 | 403/204 |
| 2016/0245116 A1 * | 8/2016 | Belmonte | F16C 33/6659 | |
| 2016/0273385 A1 * | 9/2016 | Otto | F01D 25/18 | |
| 2016/0369884 A1 * | 12/2016 | Otto | F02C 7/06 | |
| 2016/0376988 A1 * | 12/2016 | Sheridan | F04D 29/325 | 60/39.08 |
| 2016/0377167 A1 * | 12/2016 | Sheridan | F16H 57/0471 | 60/226.1 |
| 2017/0009776 A1 * | 1/2017 | Gomanne | F01D 25/20 | |
| 2017/0108113 A1 * | 4/2017 | Hasting | F16H 57/0471 | |
| 2017/0138217 A1 * | 5/2017 | Schwarz | G01N 15/0656 | |
| 2017/0145857 A1 * | 5/2017 | Pikovsky | F01D 25/18 | |
| 2017/0159798 A1 * | 6/2017 | Sheridan | F16H 57/0486 | |

OTHER PUBLICATIONS

Extended European Search Report dated Jun. 1, 2016 in European Application No. 14819557.1.

International Preliminary Report on Patentability dated Dec. 8, 2015 in Application No. PCT/US2014/033205.

\* cited by examiner ical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

MANIFOLD FOR GAS TURBINE

CROSS-REFERENCE TO RELATED APPLICATIONS

This application is a continuation of, claims priority to and the benefit of, PCT/US2014/033205 filed on Apr. 7, 2014 and entitled "MANIFOLD FOR GAS TURBINE," which claims priority from U.S. Provisional Application No. 61/831,960 filed on Jun. 6, 2013 and entitled "MANIFOLD FOR GAS TURBINE." Both of the aforementioned applications are incorporated herein by reference in their entirety.

FIELD OF INVENTION

The present disclosure relates to engine gear lubrication systems and more specifically a manifold for lubricating a turbine engine gear system.

BACKGROUND OF THE INVENTION

Typical turbine engines have multiple shafts and/or spools that transmit torque between turbine and compressor sections of the engine. For example, a low speed spool may generally include a low shaft that interconnects a fan, a low pressure compressor, and a low pressure turbine. A high speed spool may generally include a high shaft that interconnects a high pressure compressor and a high pressure turbine. The low shaft rotates at a slower speed than the high shaft, and further, the low shaft may be connected to the fan through a geared architecture to drive the fan at a lower speed than the low speed spool.

An oil manifold may be mounted to a housing of the geared architecture to lubricate gears within the housing. Traditionally, the oil manifold has comprised a single-piece part that comprises a casted component with cored flow passages. Inspection of the cored flow passages is time consuming and expensive.

SUMMARY OF THE INVENTION

In various embodiments a manifold may comprise a first plate and a second plate. The first plate may comprise an engagement member. The second plate may have a groove defined therein. The engagement member may be installable in the groove. The manifold may be configured to conduct a fluid to a gear assembly through the first plate and the second plate.

In various embodiments, a turbine engine may comprise a gear assembly and a manifold. The manifold may be operatively coupled to and in fluid communication with the gear assembly. The manifold may comprise a first portion and a second portion. The first portion may have a first groove and a second groove. The first groove and the second groove may be defined along a diameter of the first portion. The second portion may have a first engagement member installable in the first groove and a second engagement member installable in the second groove.

In various embodiments, a manifold assembly may comprise a first plate and a second plate. The first plate may comprise a first engagement member and a first groove. The first groove may be defined along a diameter of the first plate. The second plate may comprise a second engagement member and a second groove. The second groove may be defined along a diameter of the second plate. The first engagement member may be configured to rotatably engage the second groove. The second engagement member may be configured to rotatably engage the first groove.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, "aft" refers to the direction associated with the tail (e.g., the back end) of an aircraft, or generally, to the direction of exhaust of the gas turbine engine. As used herein, "forward" refers to the directed associated with the nose (e.g., the front end) of an aircraft, or generally, to the direction of flight or motion.

Figure 1:
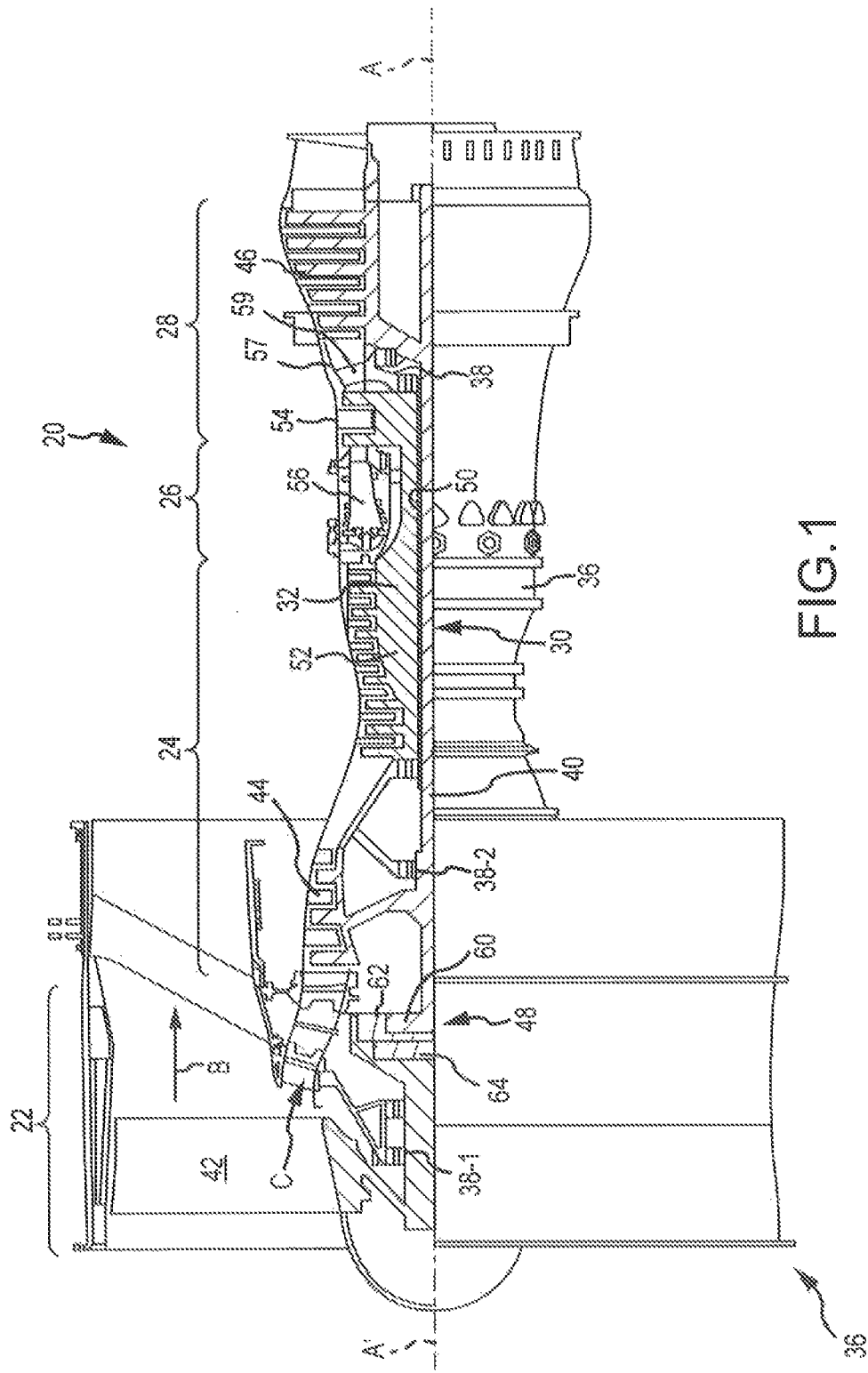
FIG. 1 is a cross-sectional view of an aircraft engine in accordance with various embodiments.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive air along a bypass flow-path B while compressor section 24 can drive air along a core flow-path C for compression and communication into combustor section 26 then expansion through turbine section 28. Although depicted as a turbofan gas turbine engine herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 via several bearing systems 38, 38-1, and 38-2. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure (or first) compressor section 44 and a low pressure (or first) turbine section 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 may couple inner shaft 40 to a rotating fan structure. High speed spool 32 may comprise an outer shaft 50 that interconnects a high pressure (or second) compressor section 52 and high pressure (or second) turbine section 54. A combustor 56 may be located between high pressure compressor 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 then high pressure compressor 52, mixed and burned with fuel in combustor 56, then expanded over high pressure turbine 54 and low pressure turbine 46. Mid-turbine frame 57 includes airfoils 59 which are in the core airflow path. Turbines 46, 54 rotationally drive the respective low speed spool 30 and high speed spool 32 in response to the expansion.

Gas turbine engine 20 may be, for example, a high-bypass geared aircraft engine. In various embodiments, the bypass ratio of gas turbine engine 20 may be greater than about six (6). In various other embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Gear architecture 48 may have a gear reduction ratio of greater than about 2.3 and low pressure turbine 46 may have a pressure ratio that is greater than about 5. In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about 5:1. Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans.

In various embodiments, a gas turbine engine 20 may comprise a manifold 64 or manifold assembly 64 configured to provide one or more lubricants to a gear assembly 60. Manifold assembly 64 may comprise a first portion and a second portion that are configured to couple together. For example, the first portion may comprise a channel. The second portion may comprise an engagement member. The engagement member may be receivable in the channel. In this regard, the first portion and the second portion may be coupled and/or joined together by installing the engagement member in the channel. The manifold assembly may also comprise one or more anti-rotation elements such as, for example, pins, fasteners, adhesives, and/or any other suitable anti-rotation element.

In various embodiments and with continued reference to FIG. 1, a manifold assembly 64 may be capable of coupling to gear housing 62 to provide a lubricant to gear assembly 60. Manifold assembly 64 may define one or more internal channels. The internal channels may in fluid communication with one or more lubricating fluid sources. These one or more fluid sources may comprise lubricating fluids that are capable of lubricating gear assemblies, such as, gear assembly 60 with one or more lubricants at various temperatures and/or viscosities.

Figure 2A:
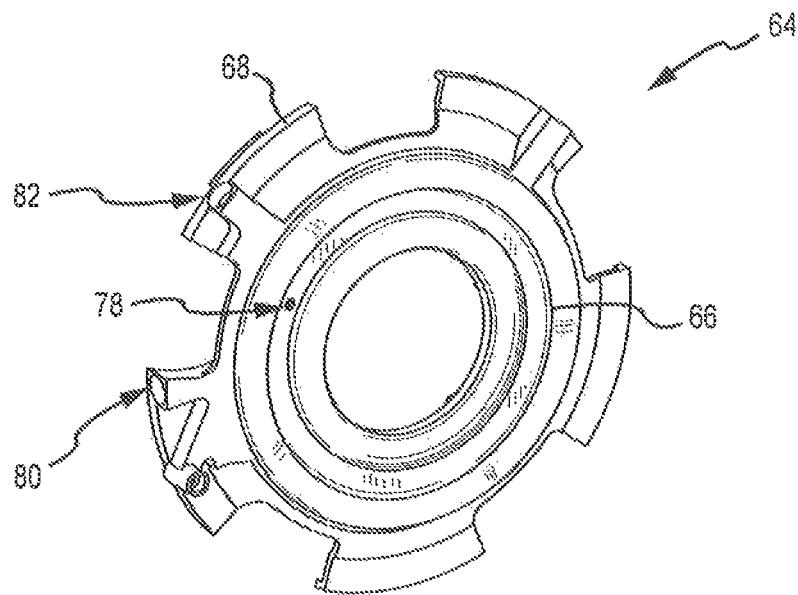
FIG. 2A is a perspective view of an manifold assembly in accordance with various embodiments.

In various embodiments and with reference to FIG. 2A, may comprise a first portion 66 (e.g., a first plate, a first manifold, and/or front plate) and a second portion 68 (e.g., a second plate, a second manifold, and/or back plate). First portion 66 and second portion 68 may couple to or engage one another. This coupling or engagement of first portion 66 and second portion 68 may result in manifold assembly 64. Manifold assembly 64 may be held together in any suitable fashion. For example, manifold assembly 64 may be coupled or held together with fasteners. Alternatively, to reduce the overall part count of an assembly, manifold assembly 64 may comprise an integral structure (e.g., integral to first portion 66 and second portion 68) to complete manifold assembly 64.

In various embodiments, manifold assembly 64 may also comprise one or more lubrication ports such as, for example, port 80, port 82 and/or the like. The lubrication ports may be coupled to one or more lubrication reservoirs. The lubrication ports may be configured to conduct a lubricant into and/or through the manifold to gear assembly 60 or any other suitable structure that benefits from lubrication.

Manifold assembly 64 may further comprise an anti-rotation element 78. Anti-rotation element 78 may be any suitable structure that prevents or minimizes rotation between first portion 66 and second portion 68. For example, anti-rotation element 78 may be a pin, a fastener, an adhesive, a clip, a detent assembly, and/or the like.

Figure 2B:
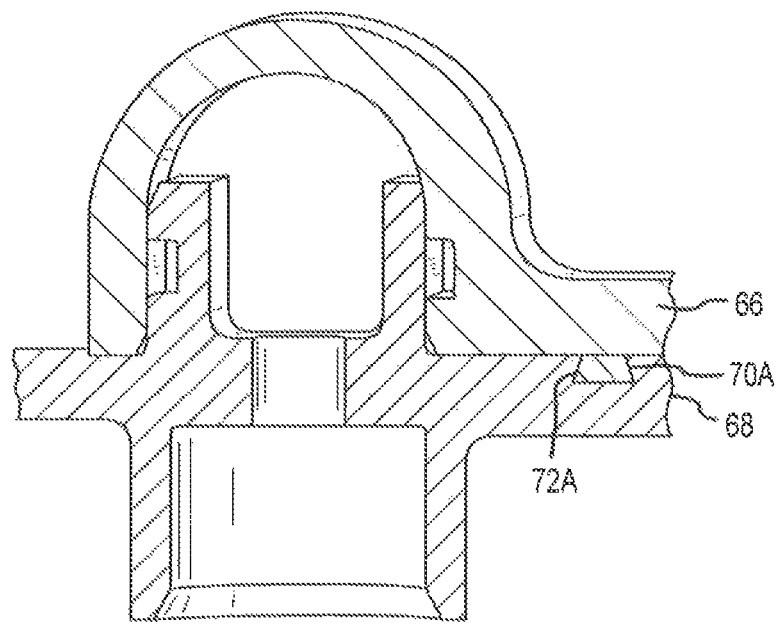
FIGS. 2B and 2C are a cross-sectional views of a portion of a manifold assembly in accordance with various embodiments.
Figure 2C:
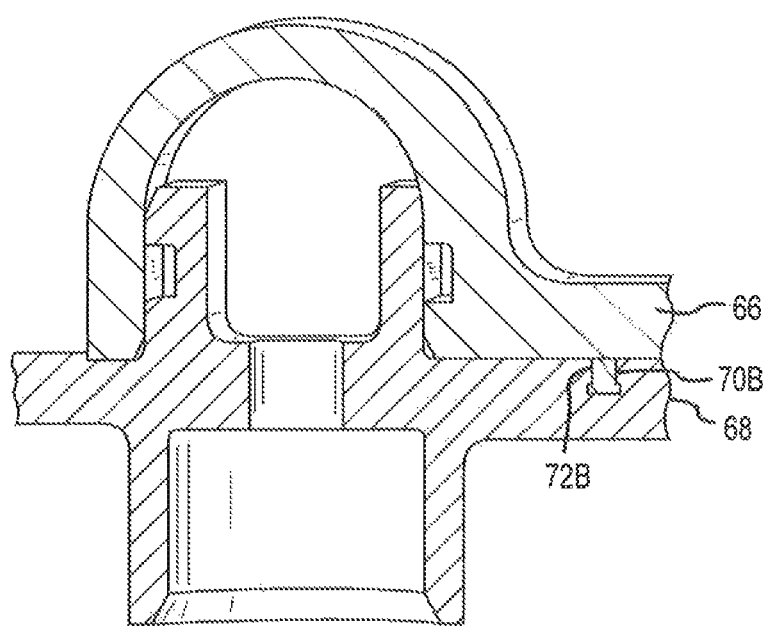

In various embodiments and with reference to FIGS. 2B and 2C, first portion 66 and second portion 68 may be coupled together with an engagement member 70 (shown as engagement member 70A and/or 70B in FIGS. 2A-2B and as engagement member 70 in FIGS. 3A-3B) and channel 72 (shown as channel 72A and/or 72B in FIGS. 2A-2B and as engagement member 70 in FIGS. 3A-3B) configuration. For example and with specific reference to FIG. 2B first portion 66 may comprise and an engagement member 70A (e.g., a tongue). Engagement member 70A may be any suitable size and/or shape. Second portion 68 may comprise one or more channels 72A (e.g., a groove), as shown in FIG. 3B. Channel 72A may be formed in second portion 68 at any suitable diameter between the inner diameter and the outer diameter of second portion 68. Channel 72 may be a continuous channel defined along an entire diameter of second portion

68. Channel 72A may also be one or more non-continuous channels defined in second portion 68. In various embodiments, channel 72 may be formed in first portion 66 and engagement member 70A may be formed on second portion 68.

Figure 3A:
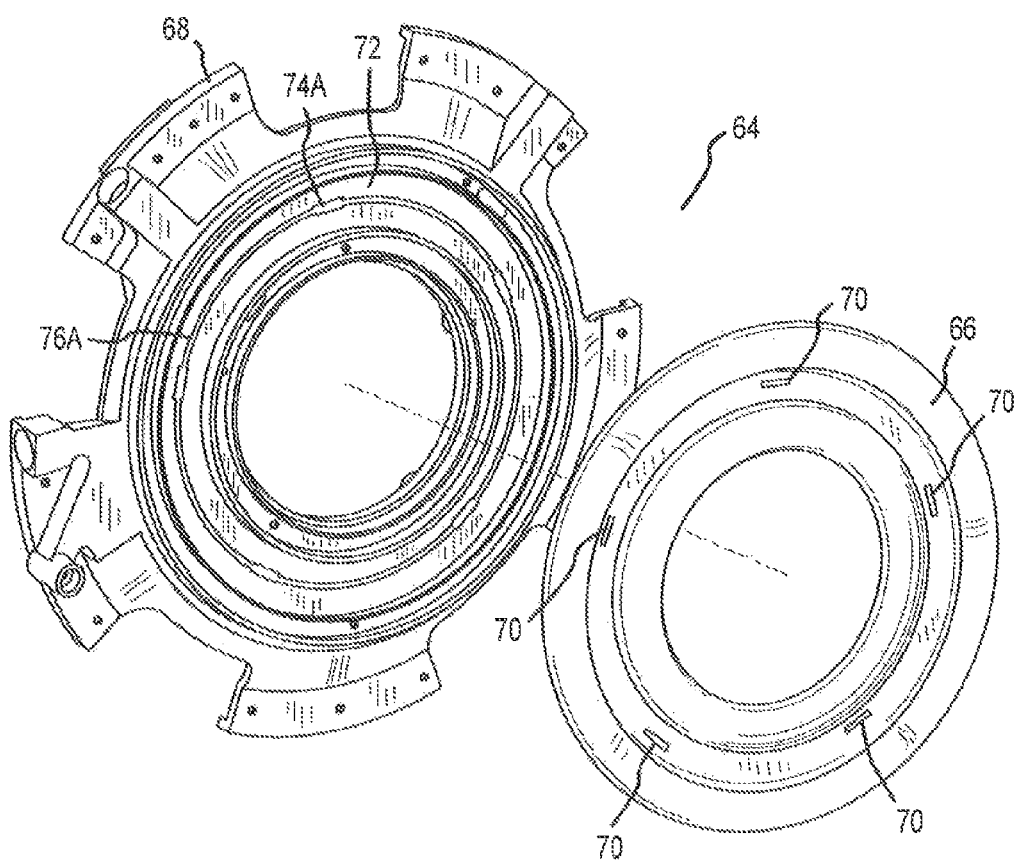
FIG. 3A is an exploded perspective view of a manifold assembly in accordance with various embodiments.
Figure 3B:
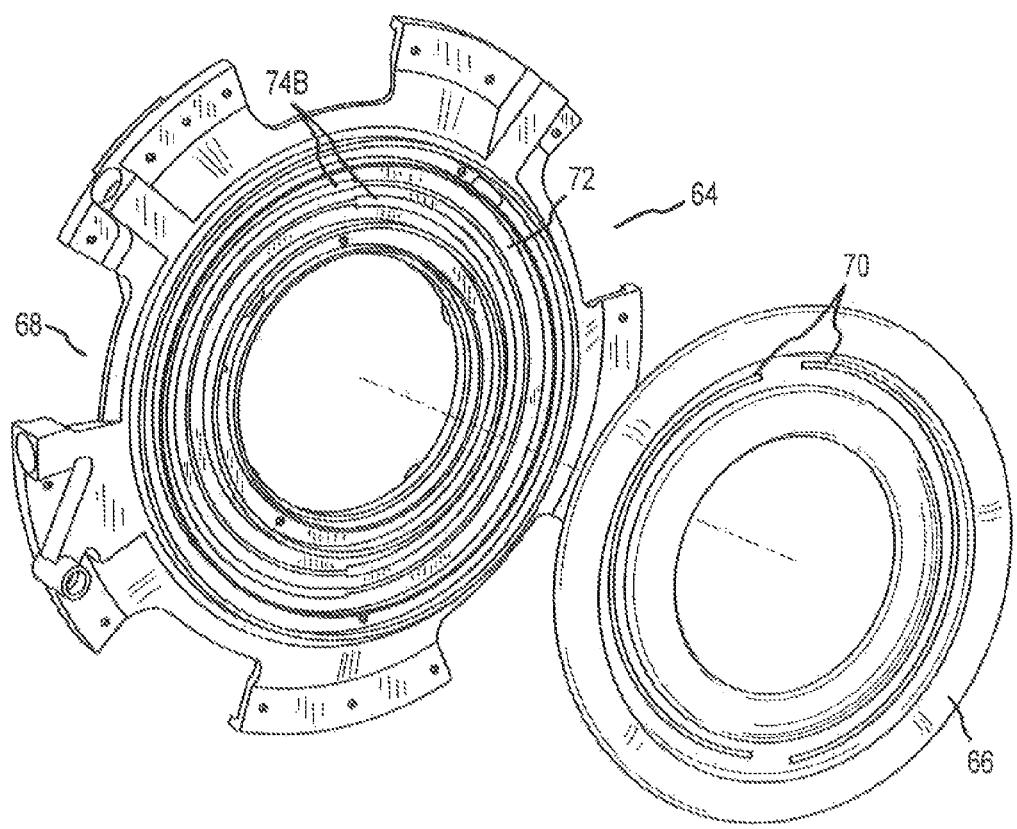
FIG. 3B is an exploded perspective view of a manifold assembly in accordance with various embodiments.

In various embodiments and with reference to FIGS. 3A and 3B, channel 72 may comprise a receiving portion 74 (shown as receiving portion 74A and/or 74B in FIGS. 3A-3B) and a retention portion 76 (shown as receiving portion 76A and/or 76B in FIGS. 3A-3B). For example, receiving portion 74 may be a portion of channel 72 with an opening that is larger than and/or capable of receiving engagement member 70. In this regard, engagement member 70 is removably insertable in receiving portion 74 of channel 72. Retention portion 76 may be capable of and/or shaped to operatively engage at least a portion of engagement member 70. Retention portion 76 of channel 72 may also comprise an anti-rotation element 78 (e.g., an integral detent and/or tension device). During assembly, first portion 66 and second portion 68 may be aligned such that engagement member 70 may be inserted into the receiving portion 74 of channel 72. First portion 66 and second portion 68 may then be rotated with respect to one another such that engagement member 70 moves from receiving portion 74 of channel 72 to retention portion 76 of channel 72 to couple first portion 66 and second portion 68 together (e.g., complete manifold assembly 64).

In various embodiments, channel 72 may be any suitable size and shape. Moreover, second portion 68 may comprise one or more channels 72, shown in FIG. 3B. Similarly, first portion 66 may comprise one or more corresponding engagement members 70, as shown in FIG. 3A. In various embodiments, second portion 68 may comprise two channels 72 and first portion 66 may comprise two corresponding engagement members 70. In various embodiments, each of first portion 66 and second portion 68 may comprise both one or more engagement members 70 and one or more channels 72 (e.g., grooves).

Channel 72 may also be defined in one or more directions. For example, as described herein channel 72 may be defined along any suitable diameter of manifold assembly 64. Channel 72 may also comprise a portion that is defined in a direction radially away from the center of manifold assembly 64 (e.g., radially away or radially outward from centerline A-A' as shown in FIG. 1) and a portion that is defined along a suitable diameter of manifold assembly 64.

Engagement member 70 may be any suitable size and/or shape. For example and as shown in FIG. 2B, engagement member 70A may have a tongue configuration. In this regard, the cross-section of engagement member 70A may be shaped like a portion of a triangle. In another example and as shown in FIG. 2C, engagement member 70B may also comprise a shaft and a head. In this regard, the shaft and head may be inserted in receiving portion 74 of channel 72B and rotated to retention portion 76 of channel 72B such that at least the head portion of engagement member 70B is engaged, coupled, and/or retained in retention portion 76 of channel 72B.

Thus, in various embodiments, the manifold assemblies described herein may provide manufacturing efficiency and improved reliability in the engine.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A manifold assembly, comprising:
 a mounting plate having an interface configured for attachment to a gear housing;
 a flow plate attached to the mounting plate and configured to provide a plurality of flow passages between the mounting plate and flow plate;
 at least one fluid inlet configured to receive fluid from a supply; and
 at least one fluid outlet configured to direct the fluid into the gear housing,
  wherein the flow plate comprises a ring-shaped structure with a center opening defining a center axis and a first ring portion defined by a first inner peripheral surface extending circumferentially about the axis and a first outer peripheral surface spaced radially outwardly relative to the first inner peripheral surface, wherein the mounting plate comprises a notch-shaped structure with a center opening concentric with the center axis and a second ring portion defined by a second inner peripheral surface extending circumferentially about the axis and a second outer peripheral surface spaced radially outwardly relative to the second inner peripheral surface, the second outer peripheral surface having a plurality of radially extending tabs interspersed by notches, the radially extending tabs configured for attachment to the gear housing and wherein the plurality of flow passages comprises at least a first flow passage formed adjacent to the first and second inner peripheral surfaces and a second flow passage formed adjacent to the first and second outer peripheral surfaces, the first and second flow passages extending circumferentially around the first and second ring portions to at least partially surround the central axis, wherein the at least one fluid inlet is disposed on one of the plurality of radially extending tabs, wherein one of the mounting plate and the flow plate comprises a groove defined therein and wherein an other of the mounting plate and the flow plate comprises an engagement member installable in the groove.

2. The manifold assembly of claim 1, further comprising an anti-rotation element.

3. The manifold assembly of claim 2, wherein the anti-rotation element is at least one of a fastener, a pin, an adhesive, a tensioning device and a detent assembly.

4. The manifold assembly of claim 1, wherein the groove comprises a receiving portion and a retention portion.

5. The manifold assembly of claim 1, wherein the engagement member is a tongue.

6. The manifold assembly of claim 1, wherein the mounting plate is rotatably coupled to the flow plate.

7. A turbine engine, comprising;
a gear assembly;
a mounting plate having an interface configured for attachment to a gear housing;
a flow plate attached to the mounting plate and configured to provide a plurality of flow passages between the mounting plate and flow plate;
at least one fluid inlet configured to receive fluid from a supply; and
at least one fluid outlet configured to direct the fluid into the gear housing,
wherein the flow plate comprises a ring-shaped structure with a center opening defining a center axis and a first ring portion defined by a first inner peripheral surface extending circumferentially about the axis and a first outer peripheral surface spaced radially outwardly relative to the first inner peripheral surface,
wherein the mounting plate comprises a notch-shaped structure with a center opening concentric with the center axis and a second ring portion defined by a second inner peripheral surface extending circumferentially about the axis and a second outer peripheral surface spaced radially outwardly relative to the second inner peripheral surface, the second outer peripheral surface having a plurality of radially extending tabs interspersed by notches, the radially extending tabs configured for attachment to the gear housing and wherein the plurality of flow passages comprises at least a first flow passage formed adjacent to the first and second inner peripheral surfaces and a second flow passage formed adjacent to the first and second outer peripheral surfaces, the first and second flow passages extending circumferentially around the first and second ring portions to at least partially surround the central axis, wherein the at least one fluid inlet is disposed on one of the plurality of radially extending tabs, wherein one of the mounting plate and the flow plate comprises a first groove and a second groove, wherein the first groove and the second groove are defined along a diameter relative to the central axis and wherein an other of the mounting plate and the flow plate comprises a first engagement member installable in the first groove and a second engagement member installable in the second groove.

8. The turbine engine of claim 7, wherein the first groove further comprises a first groove portion that is defined radially outward from a centerline of the turbine engine.

9. The turbine engine of claim 7, wherein the engagement member comprises a shaft and a head, and wherein at least the head in retained in the groove.

10. The turbine engine of claim 7, wherein the mounting plate rotatably couples to the flow plate.

11. The turbine engine of claim 7, wherein the manifold is configured to conduct a fluid to the gear assembly.

12. The turbine engine of claim 7, wherein the first groove comprises a receiving portion and a retention portion.

13. The turbine engine of claim 7,
wherein one of the mounting plate and the flow plate comprises a first groove, a second groove a third groove and a fourth groove, wherein the first groove, the second groove, the third groove and the fourth groove are defined along a diameter relative to the central axis and
wherein the other of the mounting plate and the flow plate comprises a first engagement member installable in the first groove, a second engagement member installable in the second groove, a third engagement member installable in the third groove and a fourth engagement member installable in the fourth groove.

14. The turbine engine of claim 7, wherein the first groove comprises an integral anti-rotation element.

15. The turbine engine of claim 14, wherein the integral anti-rotation element is at least one of a detent mechanism and a tensioning device.

16. A manifold assembly, comprising:
a mounting plate having an interface configured for attachment to a gear housing;
a flow plate attached to the mounting plate and configured to provide a plurality of flow passages between the mounting plate and flow plate;
at least one fluid inlet configured to receive fluid from a supply; and
at least one fluid outlet configured to direct the fluid into the gear housing,
wherein the flow plate comprises a ring-shaped structure with a center opening defining a center axis and a first ring portion defined by a first inner peripheral surface extending circumferentially about the axis and a first outer peripheral surface spaced radially outwardly relative to the first inner peripheral surface, wherein the mounting plate comprises a notch-shaped structure with a center opening concentric with the center axis and a second ring portion defined by a second inner peripheral surface extending circumferentially about the axis and a second outer peripheral surface spaced radially outwardly relative to the second inner peripheral surface, the second outer peripheral surface having a plurality of radially extending tabs interspersed by notches, the radially extending tabs configured for attachment to the gear housing and wherein the plurality of flow passages comprises at least a first flow passage formed adjacent to the first and second inner peripheral surfaces and a second flow passage formed adjacent to the first and second outer peripheral surfaces, the first and second flow passages extending circumferentially around the first and second ring portions to at least partially surround the central axis, wherein the at least one fluid inlet is disposed on one of the plurality of radially extending tabs, wherein one of the mounting plate and the flow plate comprises a first engagement member and a first groove defined along a diameter defined with respect to the central axis and wherein an other of the mounting plate and the flow plate comprises a second engagement member and a second groove, wherein the first engagement member is configured to rotatably engage the second groove and the second engagement member is configured to rotatably engage the first groove.

17. The manifold assembly of claim 16, comprising an anti-rotation element.

18. The manifold assembly of claim 16, wherein the first engagement member comprises a shaft and a head.

19. The manifold assembly of claim 16, wherein the second engagement member is a tongue.

20. The manifold assembly of claim 16, wherein the manifold assembly is configured to conduct a fluid to a gear assembly of a gas turbine engine.

* * * * *